UNITED STATES PATENT OFFICE.

FRANK GRUESSNER, OF CHICAGO, ILLINOIS, ASSIGNOR OF ONE-FOURTH TO FRANCIS B. BADT, OF SAME PLACE.

PROCESS OF RECOVERING METASTANNIC ACID.

SPECIFICATION forming part of Letters Patent No. 489,633, dated January 10, 1893.

Application filed August 15, 1892. Serial No. 443,165. (No specimens.)

*To all whom it may concern:*

Be it known that I, FRANK GRUESSNER, a citizen of the United States, residing at Chicago, Cook county, Illinois, have invented a new and useful Improvement in Processes of Recovering Metastannic Acid, of which the following is a specification.

My invention relates to means and processes of recovering metastannic acid from its combination with arsenic and other such impurities. Metastannic acid may be used for the purpose of purifying or regenerating certain solutions, especially such as contain arsenic, antimony, bismuth and the like, but in such cases the metastannic acid is combined with the arsenic and is not thereafter of any value unless revived or purified. Such a compound of metastannic acid and arsenite of copper forming a light green salt, is obtained when metastannic acid is used to purify an electrolyte which has been employed for obtaining copper.

In my method and process I first dissolve this salt in concentrated hot sulphuric acid. I secondly add thereto an oxidizing agent, such as nitric acid or fuming nitric acid, thus forming an arsenate; I thirdly dilute this product with the result that free metastannic acid is precipitated, thus the metastannic acid is recovered and purified and may be employed for any desired purpose.

I claim:

The process of recovering metastannic acid or freeing it from arsenic, which consists in dissolving the compound in concentrated hot sulphuric acid, then adding an oxidizing agent and then diluting the mixture until free metastannic acid is precipitated.

FRANK GRUESSNER.

Witnesses:
FRANCIS W. PARKER,
WALTER J. GUNTHORP.